United States Patent [19]

Thacker

[11] Patent Number: 5,058,131

[45] Date of Patent: Oct. 15, 1991

[54] TRANSMITTING HIGH-BANDWIDTH SIGNALS ON COAXIAL CABLE

[75] Inventor: Charles P. Thacker, Palo Alto, Calif.

[73] Assignee: Digital Equipment Corporation, Maynard, Mass.

[21] Appl. No.: 500,214

[22] Filed: Mar. 27, 1990

Related U.S. Application Data

[63] Continuation of Ser. No. 306,332, Feb. 3, 1989, abandoned.

[51] Int. Cl.$^5$ ............................................. H04L 25/02
[52] U.S. Cl. ...................................... 375/36; 307/358; 375/37
[58] Field of Search .................. 375/36, 37, 58, 94, 375/95, 102; 307/236, 358; 455/303, 304; 328/135, 147, 150

[56] References Cited

U.S. PATENT DOCUMENTS

| | | | |
|---|---|---|---|
| 3,465,101 | 9/1969 | Christian et al. | 375/36 |
| 3,532,905 | 10/1970 | Zijta et al. | 307/358 |
| 3,676,783 | 7/1972 | Kinbara et al. | 307/358 |
| 3,763,436 | 10/1973 | Haw | 307/358 |
| 3,798,608 | 3/1974 | Huebner | 375/36 |
| 4,021,685 | 5/1977 | Goodall et al. | 375/36 |
| 4,179,664 | 12/1979 | Bedwell | 307/358 |
| 4,649,550 | 3/1987 | Mount, II | 375/37 |

Primary Examiner—Benedict V. Safourek
Attorney, Agent, or Firm—Flehr, Hohbach, Test, Albritton & Herbert

[57] ABSTRACT

A system is disclosed for accurately transmitting binary data through a cable. The binary data are encoded into serial pulse signals in which a transition represents a "1" of the binary data and an unchanging voltage level represents a "0" of the binary data. The serial pulse signals may be distorted due to being transmitted over the cable. The received serial pulse signals are time delayed in such a way that there is a crossing point between the received serial pulse signals and the time delayed received serial pulse signals corresponding to each transition of the encoded serial pulse signals. A detector detects the crossing point and recovers the received serial pulse signal shape back to that of the serial pulse signals. An decoding device decodes the recovered serial pulse signals.

12 Claims, 2 Drawing Sheets

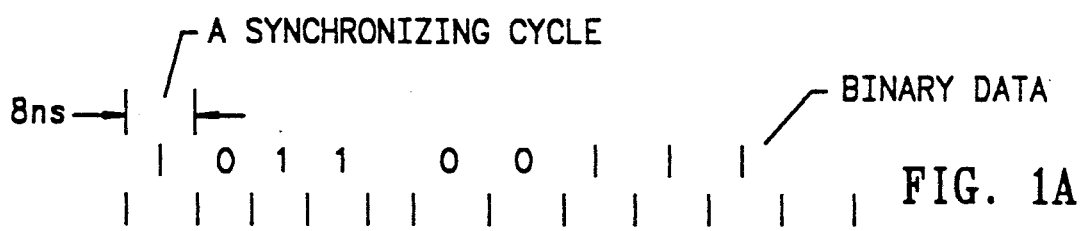
FIG. 1A
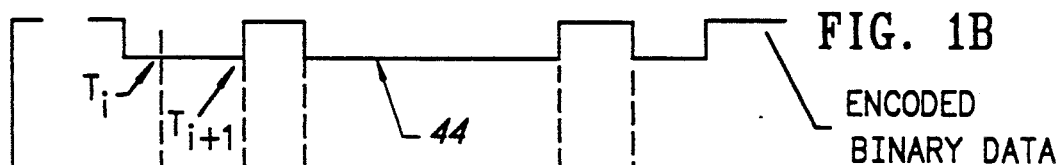
FIG. 1B
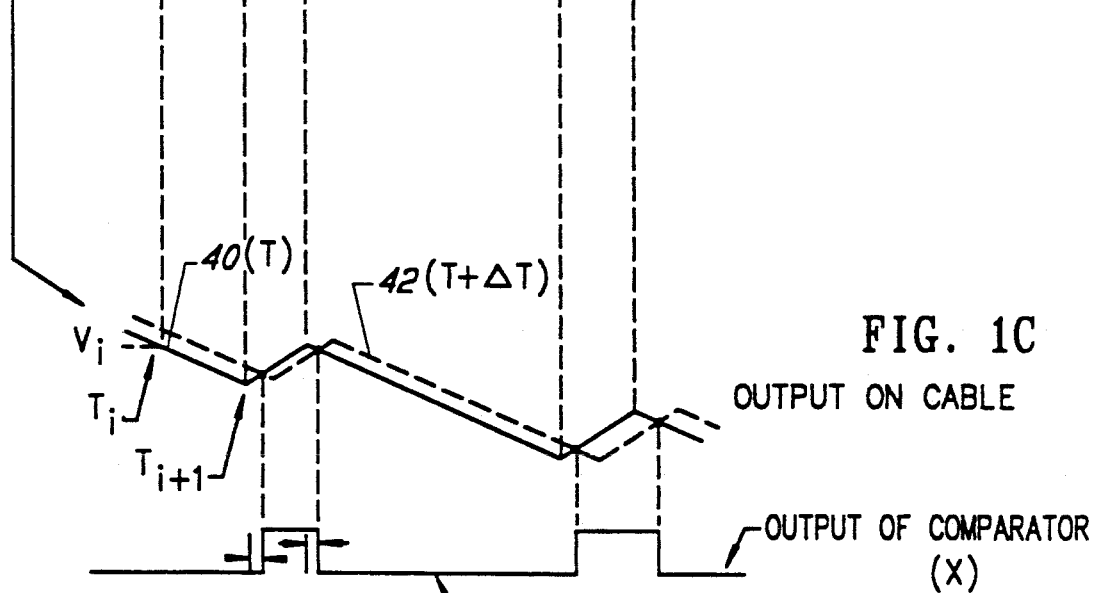
FIG. 1C
FIG. 1D
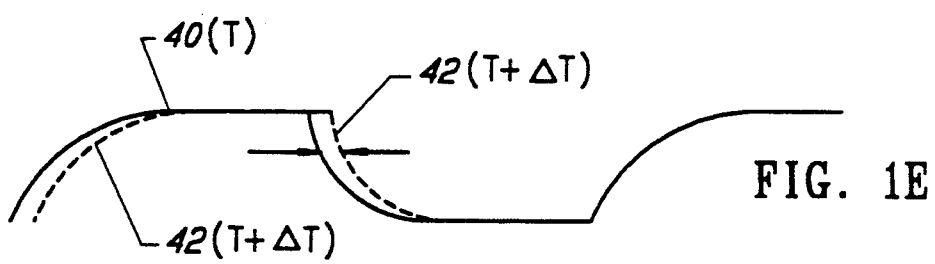
FIG. 1E
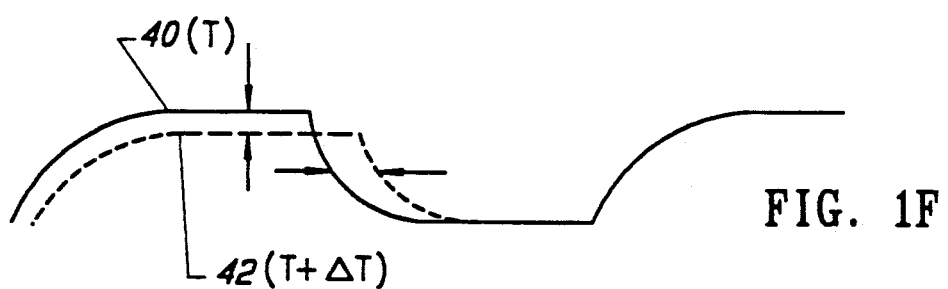
FIG. 1F

TRANSMITTING HIGH-BANDWIDTH SIGNALS ON COAXIAL CABLE

This is a continuation, division, of application Ser. No. 306,332 filed on Feb. 3, 1989, now abandoned.

FIELD OF THE INVENTION

The present invention is directed to method and apparatus for transmitting high-bandwidth signals on coaxial cable, and more particularly to method and apparatus for decoding such signals utilizing a novel differential comparator technique.

BACKGROUND OF THE INVENTION

Point-to-point data communication over coaxial or fiber optic media can be implemented using a general purpose interface such as the AMD AM7968 taxi chip transmitter and AM7969 taxi chip receiver. These devices, whose characteristics are described in AMD Publication No. 07370, issued May 1987 and thus their components and functions will not be explained in detail in the specification, provide for very high speed point-to-point communications by loading data into the input side of the transmitter chip, and outputting it on the output side of the receiver chip, the chips being separated by a serial cable of indeterminate length. A complete link suitable for full-duplex communication would consist of two such serial data links, one for each direction. In a typical data communication scheme, data is transmitted over the serial cable using square wave pulses having different phases, each transition of the transmitted chips output signal corresponding to a one, and the lack of a transition corresponding to a zero. Thus, for example, referring to FIG. 1 at line a, if the objective is to transmit a bit stream comprising 101100111, then as shown at line b, each 1 is represented as a transition. The direction of the transition in this scheme is not relevant.

It has previously been realized that transmission of a long string of zeros would present a problem for the receiver, as the receiver must periodically see a transition in order to adjust the rate at which it samples the incoming data. An absence of transitions for too long a period of time will allow the receiver to drift because of an absence of inputs to the phased lock loop incorporated in the receiver channel, causing a loss of synchronization between the receiver and the transmitter. Therefore, the transmitting chip incorporates means for implementing a run length limited (RLL) coding technique that allows transmission of 100 megabit per second data on a 125 megabit per second channel. Each 8-bit byte to be transmitted is divided into two 4-bit nibbles. Each nibble is then transmitted as a 5-bit symbol, the 5-bit symbol being defined according to a coding scheme which will prevent the transmission of more than three successive zeros at any time in the transmitted data stream.

While there are 16 combinations of each 4-bit nibble that is to be encoded, there are 32 possible combinations of resultant 5-bit code. Therefore, in addition to minimizing the number of consecutive zeros in the output code, the output codes also have the characteristic that a minimum number of zeros appear at either end of the 5-bit output.

The maximum time between transitions is 3-bit times, and the minimum time between transitions being 1-bit time (a bit time being defined as 8 nanoseconds). Considering the actual frequencies of the signals on the wire, since the transmission rate is 125 megabits per second, the frequency is half of that or 62.5 megahertz at its maximum rate, the minimum rate being one fourth of that or about 13.1 megahertz.

In known data transmission schemes, two types of links may be constructed. One uses fiber optics which allows signal transmission over long distance with minimal attenuation, but at high cost. A second type also uses the above-described data transmission protocol, but using inexpensive coaxial cable as the transmission medium.

The problem to be addressed by the present invention is the potential loss of accuracy when a signal encoded according to the method described above is transmitted on coaxial cable. The result of such transition is attenuation of the transmitted signal. It is known that the signal will be distorted since the cable behaves as a low pass filter. Low frequency components (strings of zeros, without transitions) reach higher (positive or negative) amplitudes than high frequency components (strings of ones, having transitions at an 8 nanosecond rate). For a sufficiently long cable having greater attenuation, a pattern consisting of . . . 00011000 . . . cannot be reliably detected by simply comparing the voltage on the cable with a fixed slicing level (typically zero). This is because the initial zeros cause the signal to reach an amplitude that is greater than the amplitude of the opposite going pulse caused by two adjacent ones, the succession of two transitions at an 8 nanosecond rate preventing the pulse from reaching an amplitude which can be easily and reliably detected by a nominally established slicing level or threshold comparison.

One approach to this problem of overcoming the effects of passage of the information through a long cable would be preferential amplification of the high frequencies, using schemes similar to the precompensation utilized in recording techniques.

However, such a scheme would only work for one given length of cable, because the attenuation of the high frequency signal components of the transmitted data code varies with the length of the cable through which the transmission passes.

An alternative approach would be to use a technique wherein instead of looking at the magnitudes of the signals, the detection system looks at the transitions of the signals as is done in magnetic disc recording. The difficulty with implementing this approach in a coaxial cable transmission scheme is that the frequency of transmission under consideration here is orders of magnitude faster than the rate at which data is being read in a magnetic recording scheme.

SUMMARY OF THE INVENTION

According to the present invention, a high bandwidth signal may be transmitted on a coaxial cable and accurately decoded by providing at the receiving end a receiving circuit which is not sensitive to the amplitude of the received signal, but is responsive only to the time at which transition of the signal occurs. According to the decoding method of the present invention, signals meeting the requirement are provided by differentiating the received signal which is transmitted in a code wherein zeros are indicated by a lack of transition, and ones are indicated by a transition, the differentiation providing an indication of the time at which the transition occurs. The signal which was originally transmitted is reconstructed by comparing the signal which is received at the end of the coaxial cable, with a signal received at a time $T+\Delta T$, in a standard differential comparator. The actual comparison can be expressed as $V_{OUT}(T)=K1*(V_{IN}(T)-K2*V_{IN}(T+\Delta T))$. In this expression $V_{IN}$ is the received signal at the end of the serial cable, and $V_{OUT}$ is the signal provided to the receiver chip for decoding. K1 is the gain of the differential comparator, which is a standard chip. K2 is defined by the ratio of a pair of series connected resistors connected between one end of a delay line having a characteristic delay $\Delta T$ and ground. The connecting point between the two resistors is connected to one input of the comparator, the other input of the comparator being connected directly to the serial cable output. By choosing the sum of the two resistors to be equal to the characteristic line impedance of the coaxial cable, these resistors also provide the desired termination impedance for the cable. The output of the comparator is connected directly to the receiver chip.

Other features and advantages of the present invention will become apparent to a person of skill in the art who studies the following invention disclosure given with respect to these figures.

BRIEF DESCRIPTION OF THE DRAWINGS

FIG. 1 is a timing diagram illustrating the coding technique: FIG. 1 at line (a) is the binary data and synchronizing signals; FIG. 1 at line (b) is the encoded binary data having squarewave format signals; FIG. 1 at line (c) is output on the coaxial cable; FIG. 1 at line (d) is the output of the comparator: FIG. 1 at line (e) illustrates a situation where the original signal and delayed signal do not cross each other; and FIG. 1 at line (f) illustrates that the original signal and the delayed signal cross each other even under the magnitude situation because the delayed signal is attenuated.

BRIEF DESCRIPTION OF A PREFERRED EMBODIMENT

Figure 2:
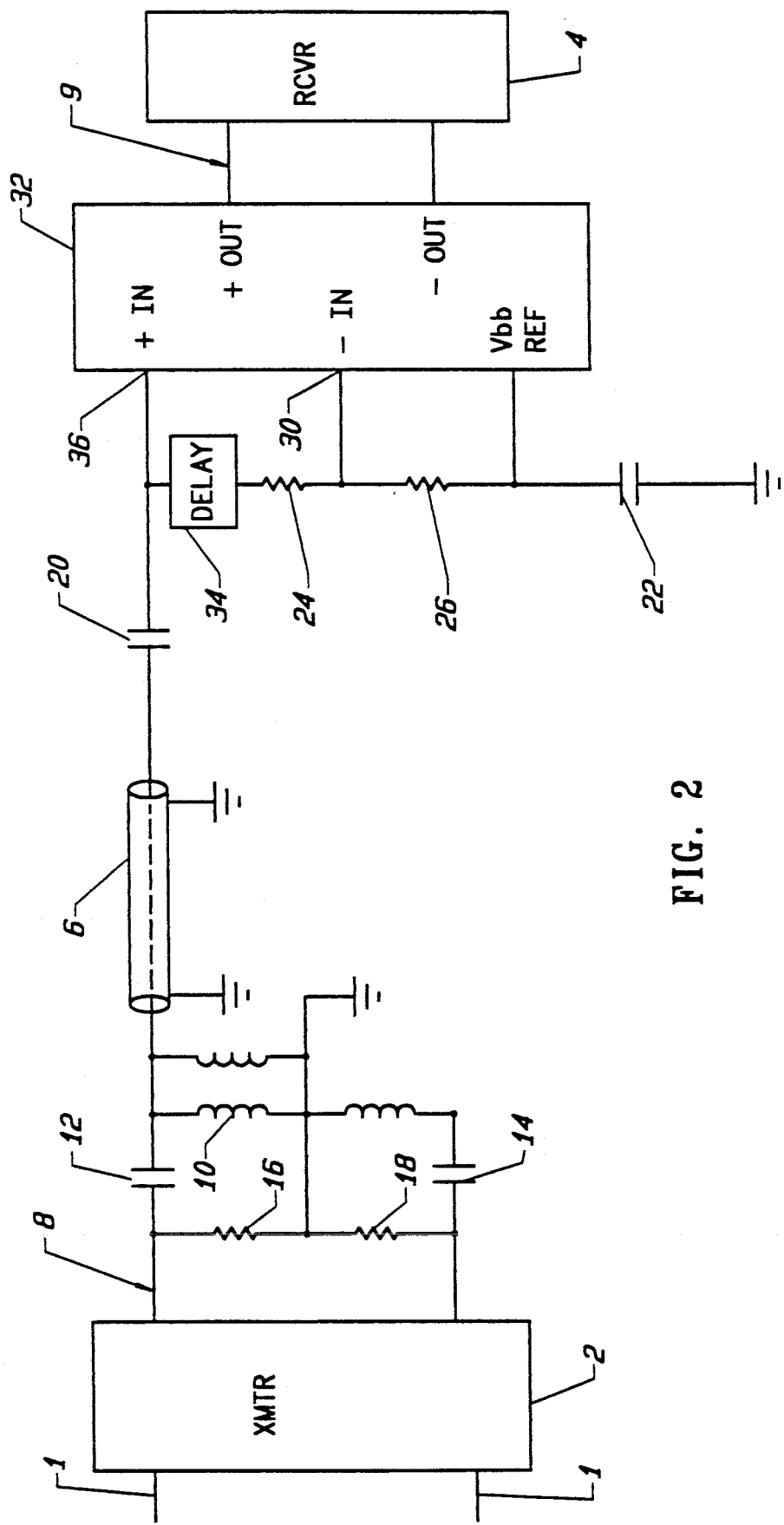
FIG. 2 is a block diagram of a circuit used to implement the method of the present invention.

The implementation of the coaxial transmitting and receiving system of the present invention is shown, for example, in FIG. 2. The method implemented using this configuration will allow error-free recovery of RLL encoded data transmitted over long distances (several hundred feet) at high speeds (100 to 125 megabits per second) on inexpensive coaxial cable.

The transmitter and receiver circuits 2, 4 are standard integrated circuit chips of which typical examples are the AM7968 and AM7969 integrated circuit chips made by Advanced Micro Devices. These transmitter and receiver chips are general purpose interfaces for very high speed (4 to 12.5 megabyte per second, 40-125 megabaud serially) point-to-point communication over coaxial or fiber optic media. Each chip 2, 4 emulates a pseudo parallel register. The chip loads data into one side and outputs it on the other, in this case the output side 8 of transmitter 2 is separated from input side 9 of receiver 4 by a long serial link which in the present embodiment comprises a coaxial cable 6. The speed of a system is adjustable over a range of frequencies with parallel bus transfer rates from 4 megabytes per second to 12.5 megabytes per second.

The differential ECL signals produced at the output 8 of the transmitter chip 2 is transformer-coupled across transformer 10 to the coaxial cable 6. Capacitors 12 and 14 are provided for DC blocking at the output of the transmitter 2, and do not have a critical value. Resistors 16, 18 are coupled across the output of the transmitter to provide output pull-down for the transmitter ECL output; with the type of chips 2, 4 specified above, the resistors have a typical value of 220 Ω.

At the receiver end of the cable 6, the capacitors 20, 22 are again provided for DC blocking. Resistors 24, 26 are connected from the end of cable 6 to ground to provide a voltage divider, the midpoint between the resistors being connected to an input 30 of a differential comparator 32 which is of standard design. The resistors are selected to provide a ratio R26/(R24+R26) equal to K2 (approximately equal to 0.8) for a reason to be described below. The sum of the two resistors R24 and R26 is equal to the line impedance, in this case 75 Ω. A delay line 34 having a selected time delay $\Delta T$ relative to the minimum time between transitions (for an intertransition time of 8 nanoseconds, a value for $\Delta T$ of 2 nanoseconds is appropriate) is coupled between an input 36 of the differential comparator and the voltage divider resistors R24, 26 described above. In this way, the transmission line 6 is terminated in its characteristic impedance of 75 Ω, and its output is capacitively coupled to one of the comparator inputs 36. The output of the transmission line is also coupled to the terminating resistors 24, 26 through delay line 34; the signal, delayed by a time $\Delta T$, is tapped to feed input 30 of the comparator.

The observation underlying the method implemented in this invention is that the receiver chip 4 is not sensitive to the amplitude of the received signal (providing that the amplitude exceeds a minimum level) but is responsive only to the time at which transitions of the signal occur. The receiver chip 4 is specified as being able to tolerate transitions that occur ±3.2 nanoseconds from the nominally correct time (i.e. the time at which through transmitter generated the transition). Signals meeting this requirement are provided by differentiating the received signals that is shown at line (c) of FIG. 1 to provide an indication of the time at which the transition occurs. Differentiation can be thought of as a comparison of a signal with a time delayed representation of the signal. Therefore, in the present system, the differentiation is accomplished by comparing the received signals from the cable 6 at a time T with the value of the same received signals at a time $\Delta T$, the delay being provided by the delay line 34 coupled to the output at capacitor 20 of the cable 6.

The function of the embodiment can be best explained by referring FIG. 1 and FIG. 2. Through its receiving terminal 1, transmitter 2 of FIG. 2 receives the binary data . . . 01100111 . . . as shown at line (a) of FIG. 1. The binary data are first latched and encoded by transmitter 2. The encoded binary data are then serially shifted out of the transmitter through terminal 8 where the encoded binary data become squarewave format signals, either in a high level voltage or low level voltage, as shown at line (b) of FIG. 1. The squarewave format signals are coupled to coaxial cable 6 through the transformer network, including transformer 10, capacitors 12 and 14, and resistors 16 and 18. By using transformer 10, the circuitry at the transmitting side is isolated from that at the receiving side. Because, as mentioned in the above, coaxial cable 6 behaves as a low pass filter, the output 40 of cable 6 becomes sawwave format signals 40 shown at line (c) of FIG. 1. Assume at time $T_i$ the voltage level of the coaxial cable is $V_i$, due to a "0" represented by the low voltage level, the output voltage level of the coaxial cable drifts toward to a lower voltage level. At time $T_{i+1}$, due to a "1" represented by a voltage transition, the output voltage level changes to a higher voltage level. It should be noticed that the saw-wave format signals are only explanatory example, and they may reach a maximum voltage level if the encoded binary data have many consecutive "0"s.

The output of the coaxial cable is delayed by delay 34 in such manner that, corresponding to each transition of the encoded squarewave format signals shown at line (b) of FIG. 1, there is a directional turning point on both the saw-wave format signals 40 the delayed saw-wave format signals 42, thereby forming a crossing point between them as illustrated at line (c) of FIG. 1.

The actual differentiation process is accomplished by comparator 32 which compares signals 40 and 42. By detecting the crossing point, together with an inquiry as to whether the later signal is changed to be greater or less than the original signal $V_{IN}(T)$, the squarewave form signal, as shown at line (b) of FIG. 1, which constituted the input to the coaxial cable, can be reconstructed back to squarewave format signals 46 as shown at line (d) of FIG. 1. The reconstructed squarewave format signals are received through terminal 9 and decoded by the receiver 4.

To reduce the susceptibility of the comparator circuit to noise, the actual comparison is $$V_{OUT}(T) = K1^{*}(V_{IN}(T) - K2^{*}V_{IN}(T - \Delta T))$$

wherein $V_{IN}$ is the received signals, $V_{OUT}$ is the signals provided to the input 9 of the receiver chip 4, K1 is the gain of the comparator, and K2 is chosen to provide hysteresis and noise immunity. In the present implementation, the comparator has a gain of about 1600, and K2 is chosen to be approximately 0.8.

Line (e) of FIG. 1 illustrates a further potential difficulty which must be accounted for in the present design. If a very low frequency signal is being transmitted, that signal rises exponentially to a given maximum value as a function of the driver voltage. However, lacking an immediate transition, because of the short time $\Delta T$ relative to the time between transitions, as illustrated at line (e) of FIG. 1, both the original signals and the delayed signals will reach the same magnitude. Therefore, in this situation, there will be no difference between the time delayed signals and the regular signals over the 2 nanosecond time delay. Therefore, it is necessary to use the factor K provided by the resistors 24, 26 to provide a reduced amplitude version of the delayed signals for comparison to the present (time T) signal. FIG. 1, line (f) illustrates the improvement after the amplitude of the time delayed signals is reduced. Therefore, the comparison is always of a signals taken directly from the cable in an attenuated version at time T plus $\Delta T$. It should also be noted that by providing a higher gain comparator, decisions can be made with smaller voltages or with K closer to 1. However, if the gain in the comparator is reduced, then the ratio must be smaller.

Other alternatives to the present invention will become apparent to a person of skill in the art who studies this present invention disclosure. For example, the values of the resistors may change; the design the circuit coupling the cable to the input 9 of the receiver chip 4 may also be modified, while conforming to implement the present method. The scope of the present invention is defined only by the following claims.

What is claimed is:

1. Apparatus for accurately transmitting binary data over a high speed serial link having a receiving terminal and a sending terminal, wherein said binary data comprises a sequence of bits representing a value selected from a set of values consisting of a first value and a second value, said apparatus comprising:

means for encoding said binary data into a serial pulse signals, wherein bits in said binary data representing said first value are encoded as a voltage transition in said serial pulse signals and bits in said binary data representing said second value are encoded as a stable voltage level in said serial pulse signals;

means for transmitting said serial pulse signals;

means for coupling said transmitted serial pulse signals to said receiving terminal of said link so that said transmitted serial pulse signals can be received at said sending terminal of said link;

delay means for delaying received serial signal pulses at said sending terminal of said link for a fixed period of time in such a way so that, corresponding to each transition of said encoded binary data, there is a signal crossing point between said received serial pulse signals and said time delayed received serial pulse signals; and detecting means for detecting said signal crossing point between said received serial pulse signals and said time delayed received serial pulse signals.

2. Apparatus as claimed in claim 1 including attenuating means coupled between said delay means and said detecting means for attenuating said time delayed received serial pulse signals, whereby the magnitudes of said received serial pulse signals and said time delayed received serial pulse signals are different whereby said signal crossing point is clearly defined.

3. Apparatus as claimed in claim 2 wherein said attenuating means comprise means for attenuating said time delayed signal by a value of about 0.8.

4. Apparatus as claimed in claim 2 wherein said detecting means has a first input terminal and a second input terminal, wherein said first input terminal is connected to said sending terminal of said link and wherein said delay means comprises a delay line connected to said sending terminal of said link, said attenuating means comprising first and second series connected resistors connected between said delay line and a reference voltage, a connection point intermediate said first and second resistors being connected to said second input terminal, whereby said time delayed attenuated signal is coupled to said second input terminal.

5. Apparatus as claimed in claim 1 wherein said link is a coaxial cable.

6. Apparatus as claimed in claim 1 wherein said transmitting means including means for converting said serial pulse signals into differential ECL signals.

7. Apparatus as claimed in claim 1, further comprising:

means for reconverting shape of said received serial pulse signals back to that of said serial pulse signals; and means for decoding said encoded binary data in response to said recovered serial pulse signals.

8. A system for accurately transmitting binary data over a high speed serial link having a receiving terminal and a sending terminal, wherein said binary data comprises a sequence of bits representing a value selected from a set of values consisting of a first value and a second value, said system comprising:

means for encoding said binary data into a serial pulse signals wherein bits in said binary data representing said first value are encoded as a voltage transition in said serial pulse signals and bits in said binary data representing said second value are encoded as a stable voltage level in said serial pulse signals;

means for converting said serial pulse signals into differential ECL signals;

means for transmitting said differential ECL signals;

means for coupling said transmitted differential ECL signals to said receiving terminal of said link so that said transmitted differential ECL signals can be received at said sending terminal of said link;

delay means for delaying said received differential ECL signals at said sending terminal of said link for a fixed period of time in such a way so that, corresponding to each transition of said encoded binary data, there is a signal crossing point between said received differential ECL signals and said time delayed received differential ECL signals; and detecting means, having a first input terminal and a second input terminal, for detecting said signal crossing point between said received differential ECL signals and said time delayed received differential ECL signals.

9. Apparatus as claimed in claim 8, wherein said received serial pulses signals become saw-wave format signals and each transition of said serial pulse signals corresponds to a directional turning point in said saw-wave format signals.

10. A method for accurately transmitting binary data over a high speed serial link having a receiving terminal and a sending terminal, wherein said binary data comprises a sequence of bits, each said bit representing a value selected from a set of values consisting of a first value and a second value, said method comprising the steps of:

encoding said binary data into a serial pulse signals, wherein bits in said binary data representing said first value are encoded as a voltage transition in said serial pulse signals and bits in said binary data representing said second value are encoded as a stable voltage level in said serial pulse signals;

transmitting said serial pulse signals;

coupling said transmitted serial pulse signals to said receiving terminal of said link so that said transmitted serial pulse signals can be received at said sending terminal of said link;

delaying said received serial signal pulses at said sending terminal of said link for a fixed period of time in such a way so that, corresponding to each transition of said encoded binary data, there is a signal crossing point between said received serial pulse signals and said time delayed received serial pulse signals; and detecting means, having a first input terminal and a second input terminal, for detecting said signal crossing point between said received serial pulse signals and said time delayed received serial pulse signals.

11. Method as claimed in claim 10 including step of:

attenuating said time delayed received serial pulse signals, whereby the magnitudes of said received serial pulse signals and said time delayed received serial pulse signals are different whereby said signal crossing point is clearly defined.

12. Method as claimed in claim 10, further comprising step of:

reconverting shape of said received serial pulse signals back to that of said serial pulse signals; and decoding said encoded binary data in response to said recovered serial pulse signals.

* * * * *

UNITED STATES PATENT AND TRADEMARK OFFICE
CERTIFICATE OF CORRECTION

PATENT NO. : 5,058,131
DATED : October 15, 1991
INVENTOR(S) : Charles P. Thacker It is certified that error appears in the above-identified patent and that said Letters Patent is hereby corrected as shown below:

Column 5,
Line 30, delete "(T-$\Delta$))" and insert therefor -- (T+$\Delta$)) --

Column 8,
Line 26, after "including" insert -- the --
Line 32, after "comprising" insert -- the --

Signed and Sealed this

Twenty-eighth Day of June, 2005

JON W. DUDAS
*Director of the United States Patent and Trademark Office*